(12) United States Patent
Griot et al.

(10) Patent No.: US 10,999,795 B2
(45) Date of Patent: May 4, 2021

(54) INDEPENDENT WAKEUPS FROM DEEP SLEEP FOR BROADCAST AND UNICAST SERVICE

(71) Applicant: QUALCOMM Incorporated, San Diego, CA (US)

(72) Inventors: Miguel Griot, La Jolla, CA (US);
Haris Zisimopoulos, London (GB);
Mungal Singh Dhanda, Slough (GB);
Amer Catovic, Carlsbad, CA (US);
Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,783

(22) Filed: Sep. 22, 2017

(65) Prior Publication Data

US 2018/0103427 A1 Apr. 12, 2018

Related U.S. Application Data

(60) Provisional application No. 62/405,175, filed on Oct. 6, 2016.

(51) Int. Cl.
*H04W 52/02* (2009.01)
*H04W 76/40* (2018.01)
*H04W 76/28* (2018.01)

(52) U.S. Cl.
CPC ... *H04W 52/0216* (2013.01); *H04W 52/0225* (2013.01); *H04W 76/40* (2018.02); *H04W 76/28* (2018.02); *Y02D 30/70* (2020.08)

(58) Field of Classification Search
None
See application file for complete search history.

(56) References Cited

U.S. PATENT DOCUMENTS

| | | | | |
|---|---|---|---|---|
| 7,330,736 B2 * | 2/2008 | Redi | ............... | H04W 52/0216 |
| | | | | 455/553.1 |
| 7,477,621 B1 * | 1/2009 | Loc | .................... | H04W 28/20 |
| | | | | 370/329 |

(Continued)

FOREIGN PATENT DOCUMENTS

| WO | WO-2016167615 A1 | 10/2016 |
|---|---|---|
| WO | WO-2017105522 A1 | 6/2017 |

OTHER PUBLICATIONS

International Search Report and Written Opinion—PCT/US2017/053235—ISA/EPO—dated Dec. 1, 2017.

*Primary Examiner* — Gregory B Sefcheck
(74) *Attorney, Agent, or Firm* — Kevin M. Donnelly

(57) ABSTRACT

Aspects of the present disclosure relate to wireless communications and, more particularly, to adjusting how certain types of devices wake up and/or stay awake for broadcast service. A method for wireless communications is provided that may be performed by a user equipment (UE). The method includes receiving a power savings configuration indicating sleep periods during which the UE is scheduled to be unreachable. The method includes determining at least one time, during at least a portion of one of the indicated sleep periods, for the UE to be awake in order to at least one of: receive or discover Multimedia Broadcast Multicast Services (MBMS) user services.

33 Claims, 13 Drawing Sheets

(56) References Cited

U.S. PATENT DOCUMENTS

| | | | |
|---|---|---|---|
| 7,535,884 B2 * | 5/2009 | Stephenson | H04W 52/0216 370/338 |
| 7,684,357 B2 * | 3/2010 | Jokinen | H04W 4/06 370/311 |
| 7,912,023 B2 * | 3/2011 | Stephenson | H04W 52/0216 370/338 |
| 8,023,442 B2 * | 9/2011 | Kim | H04W 52/0216 370/311 |
| 8,090,342 B2 * | 1/2012 | Xu | H04W 68/00 455/404.1 |
| 8,144,638 B2 * | 3/2012 | Lin | H04W 76/28 370/311 |
| 8,797,836 B2 * | 8/2014 | Zhang | H04L 5/0092 370/208 |
| 8,824,378 B2 * | 9/2014 | Wentink | H04W 52/0235 370/329 |
| 8,873,371 B2 * | 10/2014 | Chakraborty | H04W 8/30 370/216 |
| 9,125,174 B2 * | 9/2015 | Wu | H04W 72/005 |
| 9,137,823 B1 * | 9/2015 | Liu | H04W 74/006 |
| 9,144,085 B2 * | 9/2015 | Etemad | H04W 72/1215 |
| 9,148,748 B2 | 9/2015 | Wang et al. | |
| 9,307,485 B2 * | 4/2016 | Jorguseski | H04W 48/20 |
| 9,344,859 B2 * | 5/2016 | Kim | H04W 4/06 |
| 9,344,961 B2 * | 5/2016 | Ling | G06F 1/3209 |
| 9,350,550 B2 * | 5/2016 | Nix | H04W 4/70 |
| 9,398,425 B2 * | 7/2016 | Anchan | H04W 4/06 |
| 9,503,978 B2 * | 11/2016 | Ji | H04W 52/0216 |
| 9,578,476 B2 * | 2/2017 | Hedman | H04W 4/70 |
| 9,603,184 B2 * | 3/2017 | Tabet | H04W 52/0216 |
| 9,622,171 B2 * | 4/2017 | Voigt | H04W 52/0232 |
| 9,693,205 B2 | 6/2017 | Vaidya et al. | |
| 9,699,828 B2 * | 7/2017 | Das | H04W 56/0035 |
| 9,712,285 B2 * | 7/2017 | You | H04L 67/16 |
| 9,713,087 B2 * | 7/2017 | Asterjadhi | H04W 52/0274 |
| 9,713,108 B2 * | 7/2017 | Charbit | H04W 4/70 |
| 9,763,172 B2 * | 9/2017 | Vajapeyam | H04W 52/0216 |
| 9,775,111 B2 * | 9/2017 | Rabii | H04W 52/0235 |
| 9,794,320 B2 * | 10/2017 | Lee | H04W 4/18 |
| 9,894,608 B2 * | 2/2018 | Etemad | H04L 45/245 |
| 10,244,469 B2 * | 3/2019 | Sinha | H04W 52/0209 |
| 10,251,155 B2 * | 4/2019 | Gupta | H04W 72/005 |
| 10,582,450 B2 * | 3/2020 | Mandiganal | H04L 12/2803 |
| 2007/0242634 A1 * | 10/2007 | Calcev | H04W 52/0225 370/318 |
| 2012/0311101 A1 * | 12/2012 | Chao | H04L 12/189 709/219 |
| 2013/0107787 A1 * | 5/2013 | Wu | H04W 52/027 370/312 |
| 2013/0121226 A1 * | 5/2013 | Anchan | H04W 4/06 370/311 |
| 2014/0071870 A1 * | 3/2014 | Abraham | H04W 52/0206 370/311 |
| 2014/0161012 A1 * | 6/2014 | Zhong | H04L 12/12 370/311 |
| 2014/0241252 A1 * | 8/2014 | Wang | H04W 76/10 370/328 |
| 2014/0301263 A1 * | 10/2014 | Ji | H04W 52/0216 370/311 |
| 2014/0313957 A1 * | 10/2014 | Bao | H04W 52/0235 370/311 |
| 2016/0345262 A1 * | 11/2016 | Jain | H04W 68/02 |
| 2017/0064625 A1 * | 3/2017 | Sampath | H04W 52/0216 |
| 2017/0071022 A1 * | 3/2017 | Sampath | H04W 48/18 |
| 2017/0111955 A1 * | 4/2017 | Dalsgaard | H04W 76/40 |
| 2017/0171818 A1 | 6/2017 | Agarwal et al. | |
| 2017/0201940 A1 * | 7/2017 | Koratekere Honnappa | H04W 52/0206 |
| 2017/0223584 A1 * | 8/2017 | Deng | H04W 76/28 |

* cited by examiner

INDEPENDENT WAKEUPS FROM DEEP SLEEP FOR BROADCAST AND UNICAST SERVICE

CROSS-REFERENCE TO RELATED APPLICATION & PRIORITY CLAIM

This application claims benefit of and priority to U.S. Provisional Patent Application Ser. No. 62/405,175, filed Oct. 6, 2016, which is herein incorporated by reference in its entirety for all applicable purposes.

FIELD OF THE DISCLOSURE

Aspects of the present disclosure generally relate to wireless communication and, more particularly, to adjusting how certain types of devices wake up and/or stay awake for broadcast service.

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations (e.g., Node B (NB), evolved Node B (eNB), access point (AP), base station transceiver (BST), transmission reception point (TRP), next generation NB (gNB), etc.) to the terminals, and the reverse link (or uplink) refers to the communication link from the terminals to the BSs. This communication link may be established via a single-input single-output, multiple-input single-output or a multiple-input multiple-output (MIMO) system.

These multiple access technologies have been adopted in various telecommunication standards to provide a common protocol that enables different wireless devices to communicate on a municipal, national, regional, and even global level. An example of an emerging telecommunication standard is NR, for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. As the demand for mobile broadband access continues to increase, there exists a need for further improvements in LTE and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between base stations and terminals in a wireless network.

Certain aspects of the present disclosure generally relate to a method for wireless communications by a user equipment (UE). The method generally includes receiving a power savings configuration indicating sleep periods during which the UE is scheduled to be unreachable. The method includes determining at least one time, during at least a portion of one of the indicated sleep periods, for the UE to be wake in order to at least one of receive or discover Multimedia Broadcast Multicast Services (MBMS) user services.

Certain aspects of the present disclosure generally relate to an apparatus for wireless communications, such as a UE. The apparatus generally includes means for receiving a power savings configuration indicating sleep periods during which the apparatus is scheduled to be unreachable. The apparatus includes means for determining at least one time, during at least a portion of one of the indicated sleep periods, for the apparatus to be wake in order to at least one of receive or discover MBMS user services.

Certain aspects of the present disclosure generally relate to an apparatus for wireless communications, such as a UE. The apparatus generally includes a receiver configured to receive a power savings configuration indicating sleep periods during which the apparatus is scheduled to be unreachable. The apparatus includes at least one processor coupled with a memory and configured to determine at least one time, during at least a portion of one of the indicated sleep periods, for the apparatus to be wake in order to at least one of receive or discover MBMS user services.

Certain aspects of the present disclosure generally relate to a computer readable medium having computer executable code stored thereon for wireless communications. The computer readable medium generally includes code for receiving a power savings configuration indicating sleep periods during which the apparatus is scheduled to be unreachable. The computer readable medium includes code for determining at least one time, during at least a portion of one of the indicated sleep periods, for the apparatus to be wake in order to at least one of receive or discover MBMS user services. The phrase computer readable medium does not refer to a transitory propagating signal. Rather, the computer readable medium may be a non-transitory computer readable medium.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
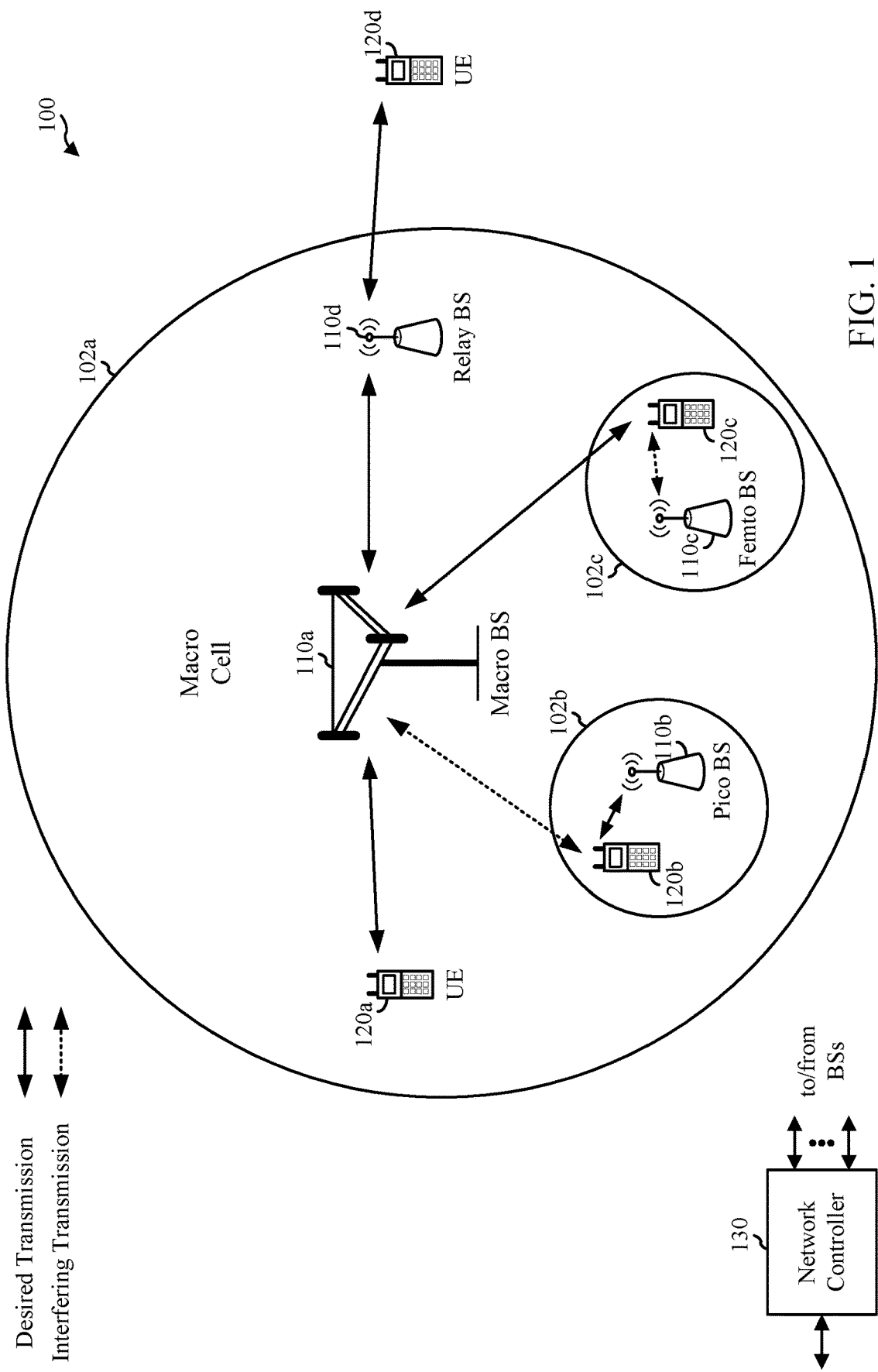
FIG. 1 illustrates an example of a wireless communication network, in accordance with certain aspects of the present disclosure.

Aspects of the present disclosure provide techniques that may help ensure that UEs receiving a same broadcast user service (e.g., Multimedia Multicast Broadcast Service (MBMS)) to be awake at relatively the same time(s) to receive the broadcast data. Techniques provided herein allow a UE to determine time to be awake, even during periods indicated as sleep periods (in which the UE is scheduled to be unreachable) by a power save configuration to receive or discover the broadcast data.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, one or more UEs 120 may be configured to determine times to be awake to receive or discover Multimedia Broadcast Multicast Services (MBMS) user services in accordance with aspects of the present disclosure.

The wireless communication network 100 may be an LTE network or some other wireless network. Wireless communication network 100 may include a number of base stations (BSs) 110 and other network entities. A BS is an entity that communicates with user equipments (UEs) and may also be referred to as a Node B, evolved NB (eNB), a next generation NB (gNB), an access point (AP), new radio (NR) BS, 5G BS, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station" and "cell" may be used interchangeably herein.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

Figure 2:
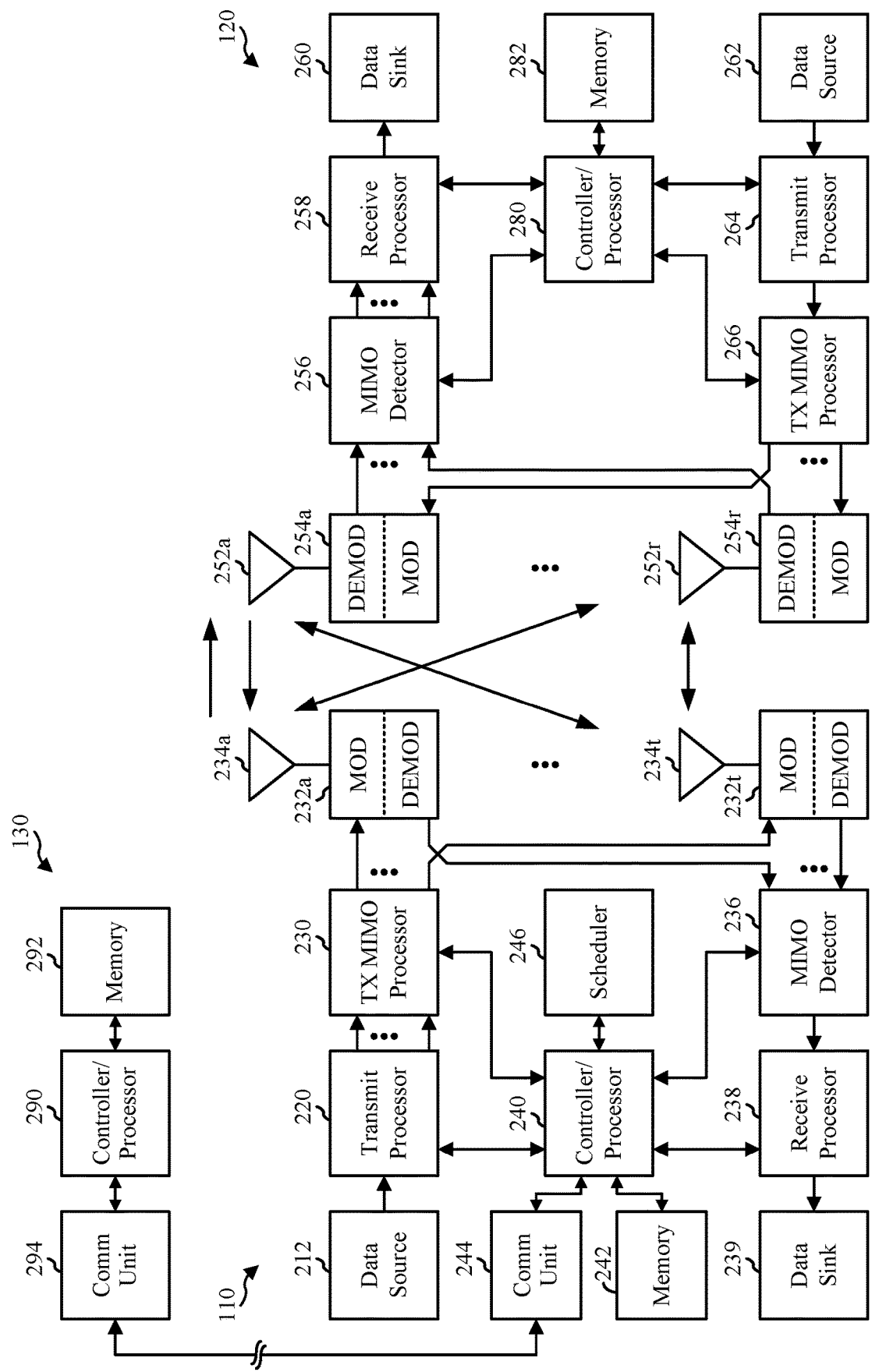
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BSs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on channel quality information (CQI) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the primary synchronization signal (PSS) and the secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal receive power (RSRP), receive signal strength indicator (RSSI), receive signal receive quality (RSRQ), CQI, interference feedback Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Figure 10:
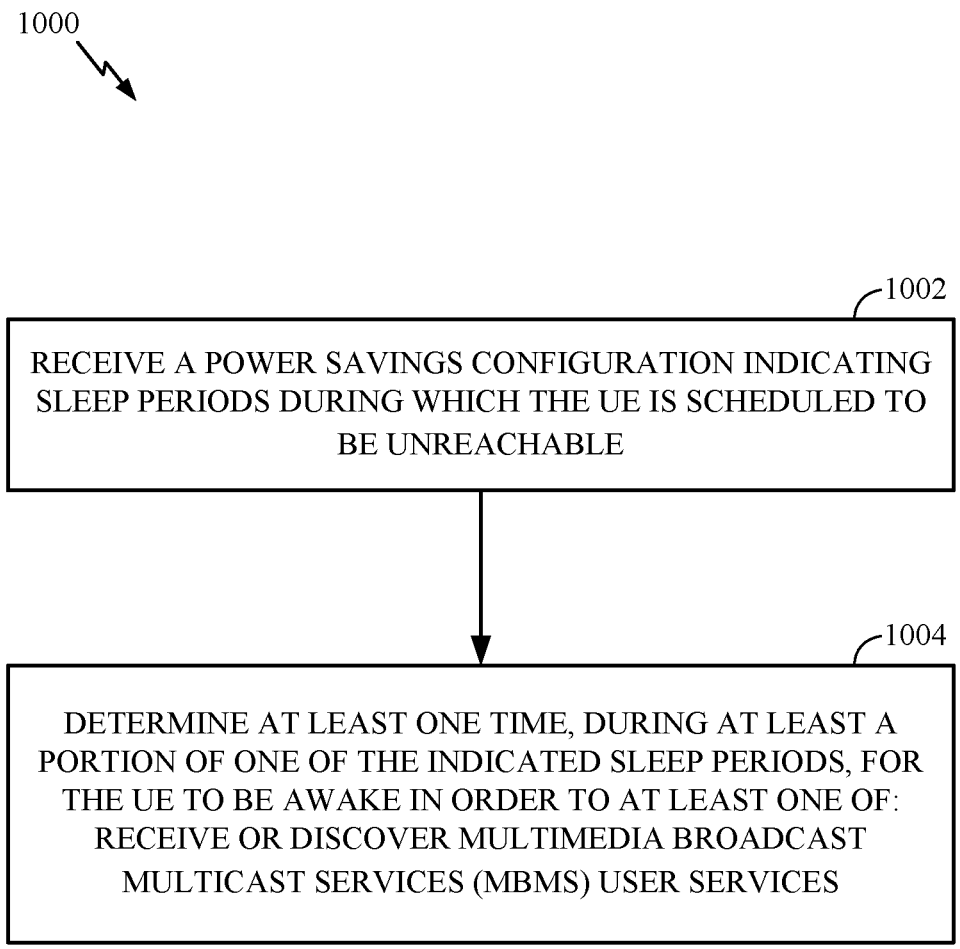
FIG. 10 illustrates example operations performed by a UE for wireless communications, in accordance with certain aspects of the present disclosure.

Controller/processor 280 may direct the operation UE 120 to perform techniques presented herein for determining independent wakeups for to receive or discover broadcast data (e.g., in accordance with the operations shown in FIG. 10).

Memories 242 and 282 may store data and program codes for BS 110 and UE 120, respectively. A scheduler 246 may schedule UEs for data transmission on the downlink and/or uplink.

Figure 3:
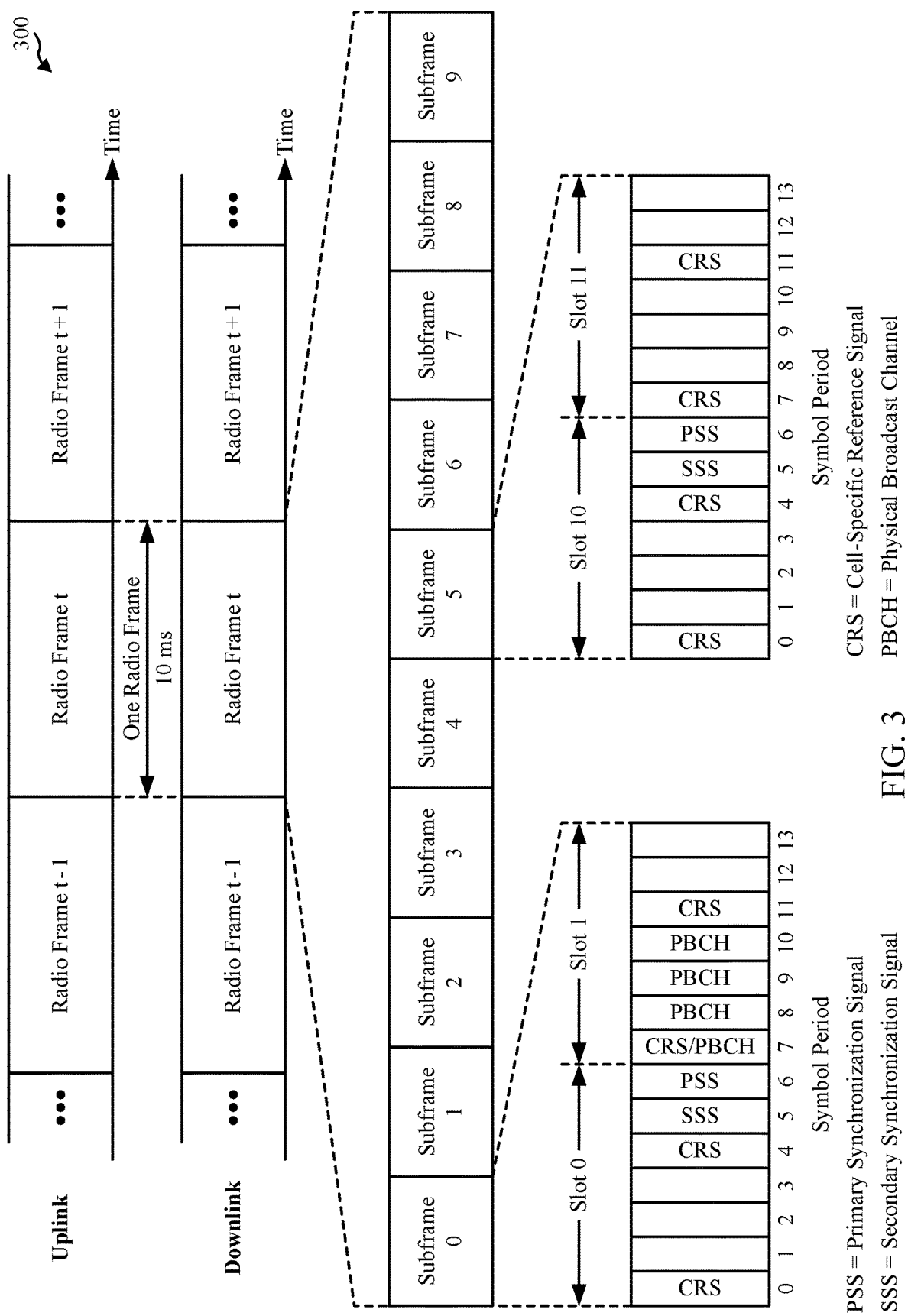
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in LTE. The transmission timeline for each of the downlink and uplink may be partitioned into units of radio frames. Each radio frame may have a predetermined duration (e.g., 10 milliseconds (ms)) and may be partitioned into 10 subframes (e.g., 1 ms subframes) with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−0.

In LTE, a BS may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. In aspects, a serving cell and one or more neighbor cells are synchronous, such that SSS for the serving and the one or more neighbor cells may interfere.

Figure 4:
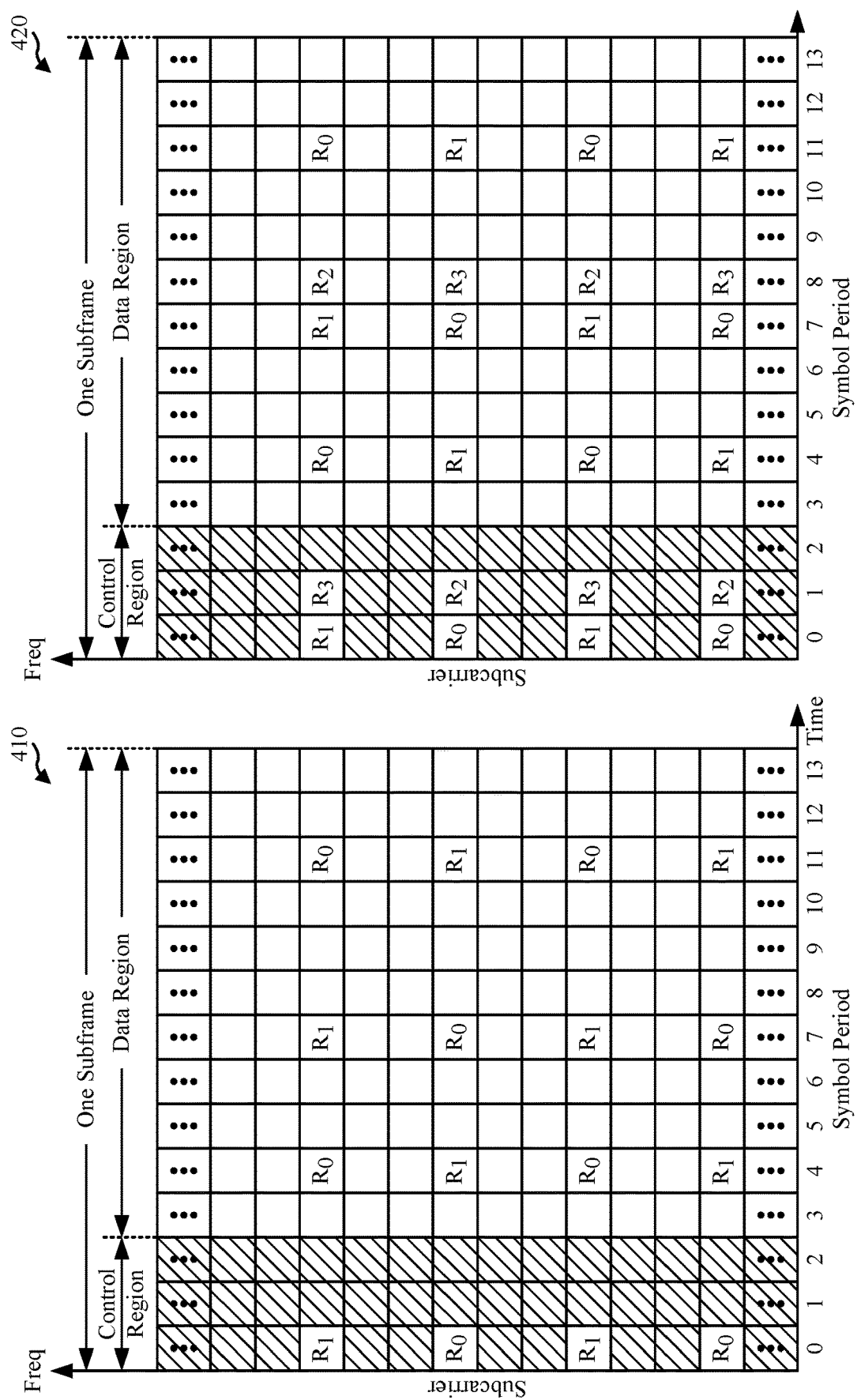
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A cell-specific reference signal (CRS) may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, for example, generated based on a cell identity (ID). In FIG. 4, for a given RE with label Ra, a modulation symbol may be transmitted on that RE from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless communication network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Figure 5:
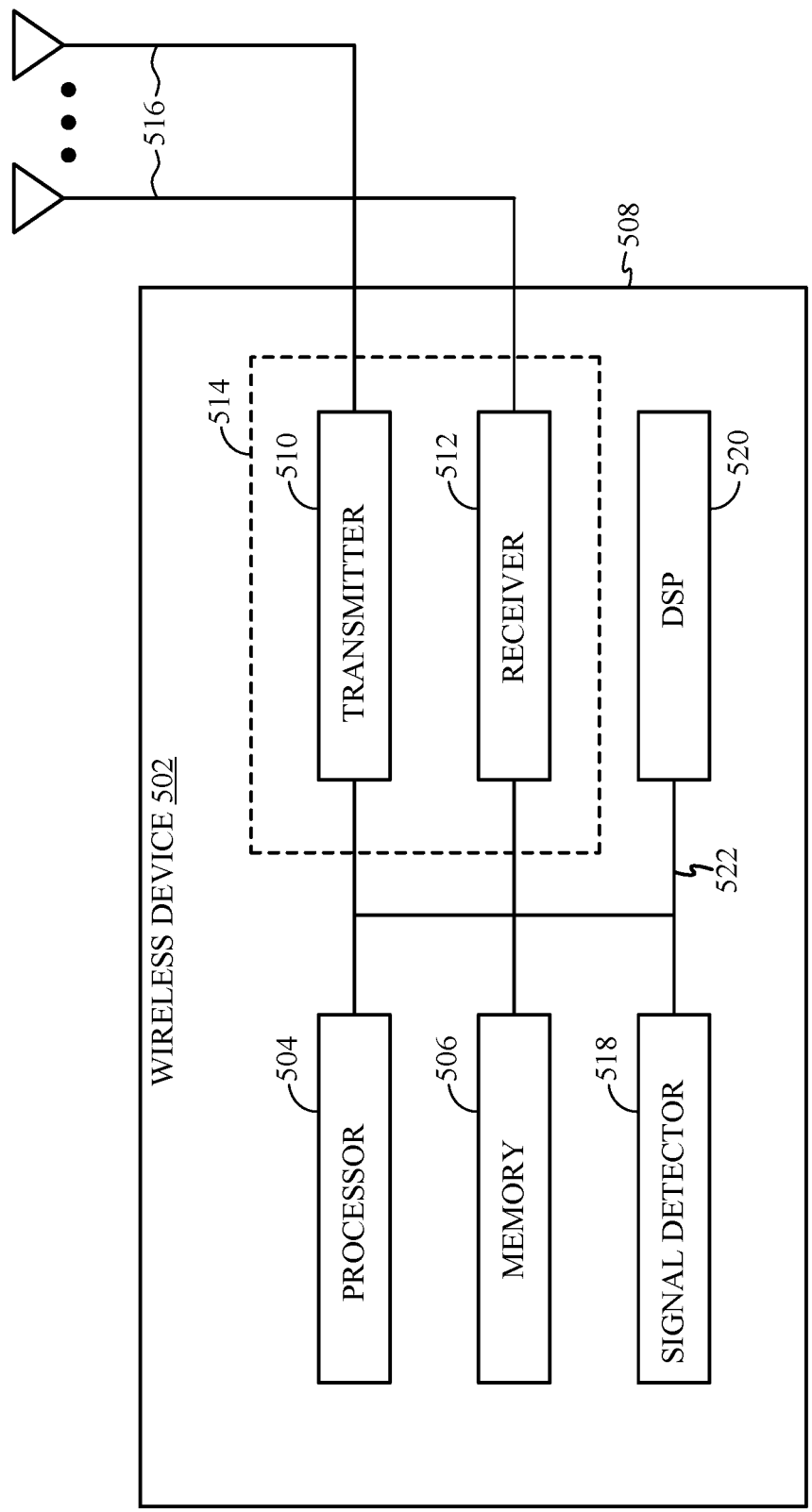
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be any of the wireless nodes (e.g., UEs 120). For example, the wireless device 502 may be configured to perform operations and techniques illustrated in FIG. 10 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low-latency communications (URLLC) service.

A single component carrier bandwidth of 100 MHz may be supported. NR RBs may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 8 and 9.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
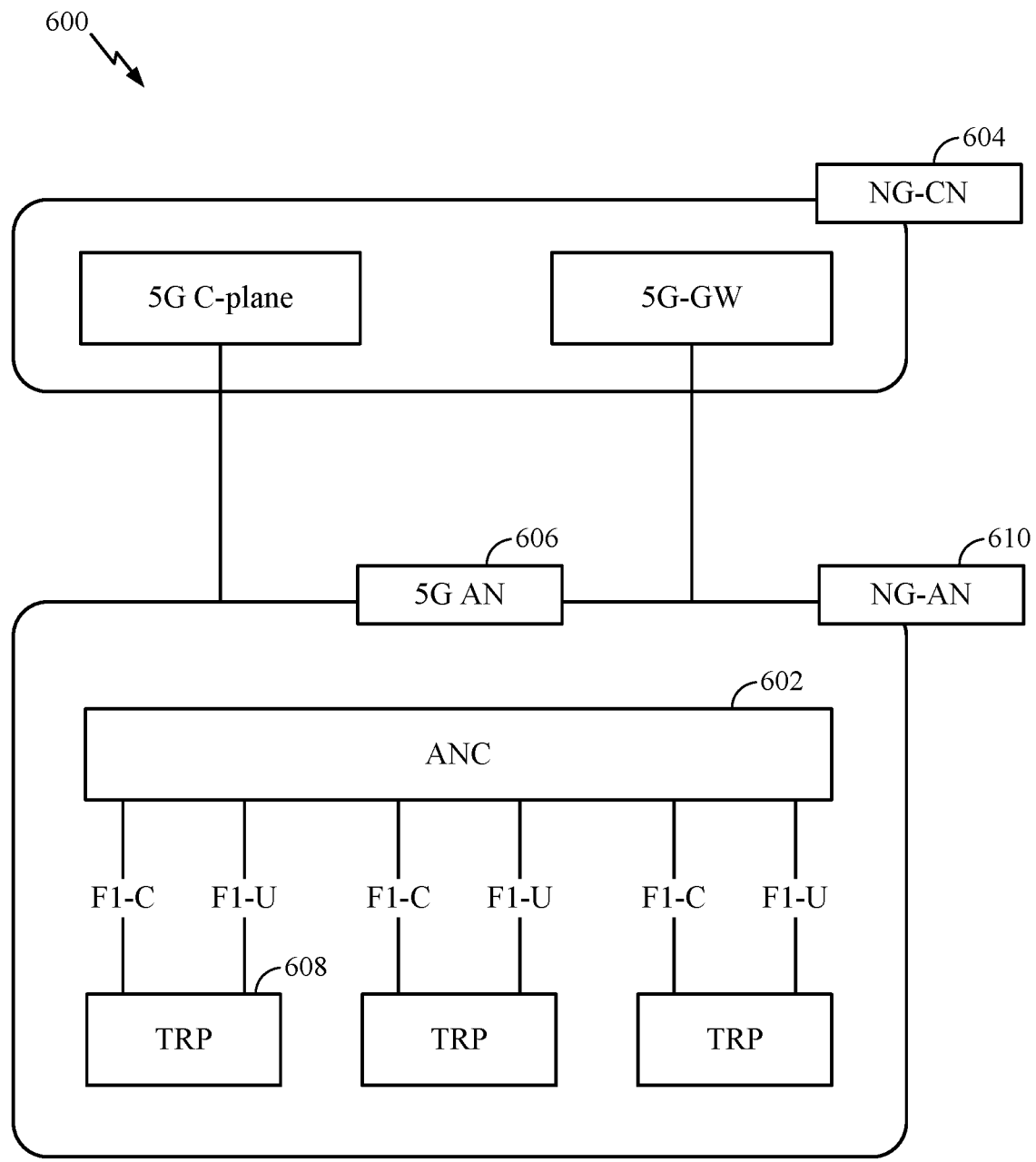
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC 602 may be a central unit (CU) of the distributed RAN 600. The backhaul interface to the next generation core network (NG-CN) 604 may terminate at the ANC 602. The backhaul interface to neighboring next generation access nodes (NG-ANs) 610 may terminate at the ANC 602. The ANC 602 may include one or more TRPs 608 (which may also be referred to as BSs, NR BSs, Node Bs, 5G NBs, APs, or some other term). As described above, a TRP may be used interchangeably with "cell."

The TRPs 608 may be a distributed unit (DU). The TRPs may be connected to one ANC (ANC 602) or more than one ANC (not illustrated). For example, for RAN sharing, radio as a service (RaaS), and service specific AND deployments, the TRP 608 may be connected to more than one ANC. A TRP may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 610 may support dual connectivity with NR. The NG-AN 610 may share a common fronthaul for LTE and NR. The logical architecture may enable cooperation between and among TRPs 608. For example, cooperation may be preset within a TRP and/or across TRPs via the ANC 602. No inter-TRP interface may be present. The logical architecture may support a dynamic configuration of split logical function. The PDCP, RLC, and/or MAC protocols may be adaptably placed at the ANC 602 or TRP 608.

A BS may include a central unit (CU) (e.g., ANC 602) and/or one or more distributed units (e.g., one or more TRPs 608).

Figure 7:
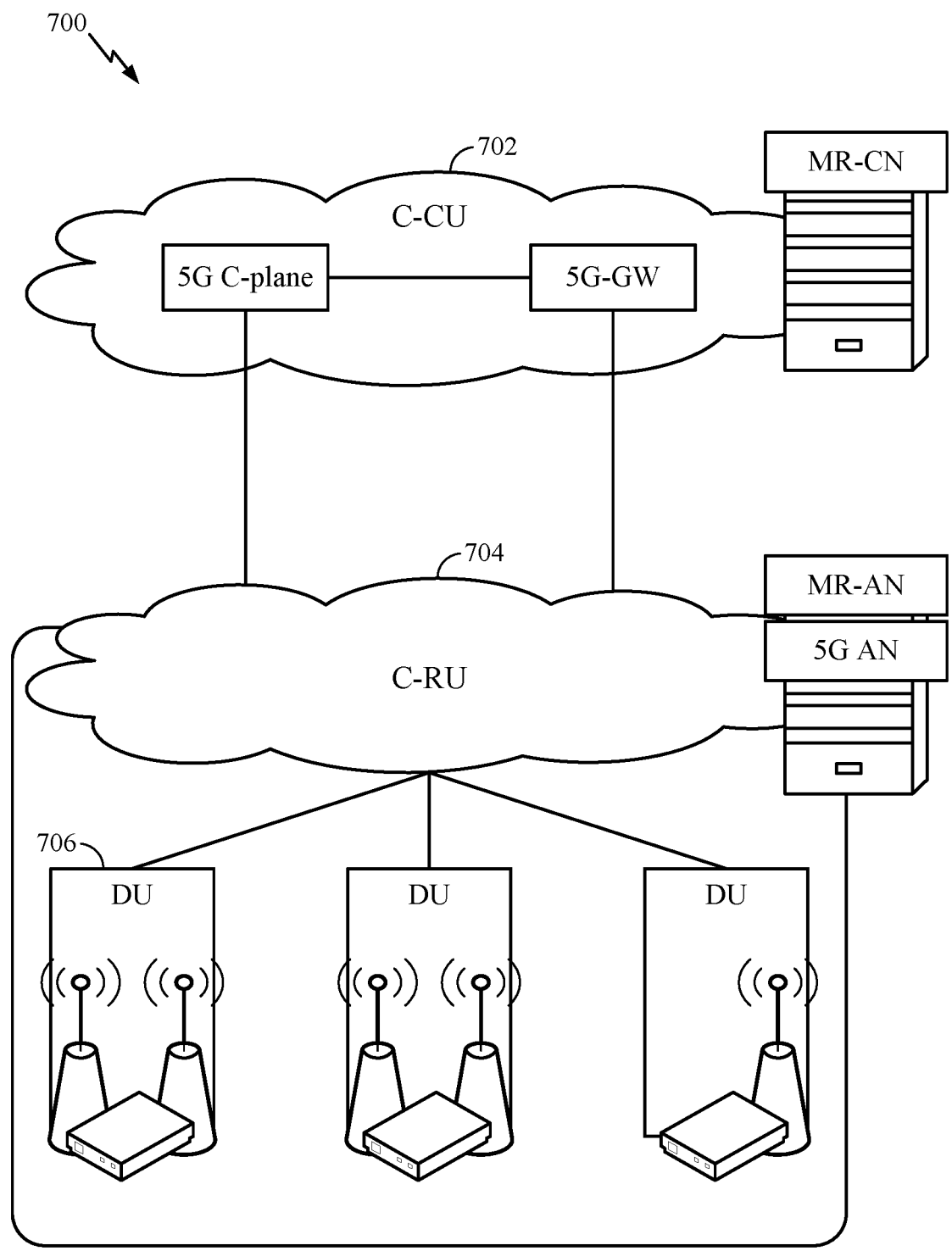
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. The C-CU 702 may be centrally deployed. C-CU functionality may be offloaded (e.g., to advanced wireless services (AWS)), in an effort to handle peak capacity.

A centralized RAN unit (C-RU) 704 may host one or more ANC functions. Optionally, the C-RU 704 may host core network functions locally. The C-RU 704 may have distributed deployment. The C-RU 704 may be close to the network edge.

A DU 706 may host one or more TRPs. The DU may be located at edges of the network with radio frequency (RF) functionality.

Figure 8:
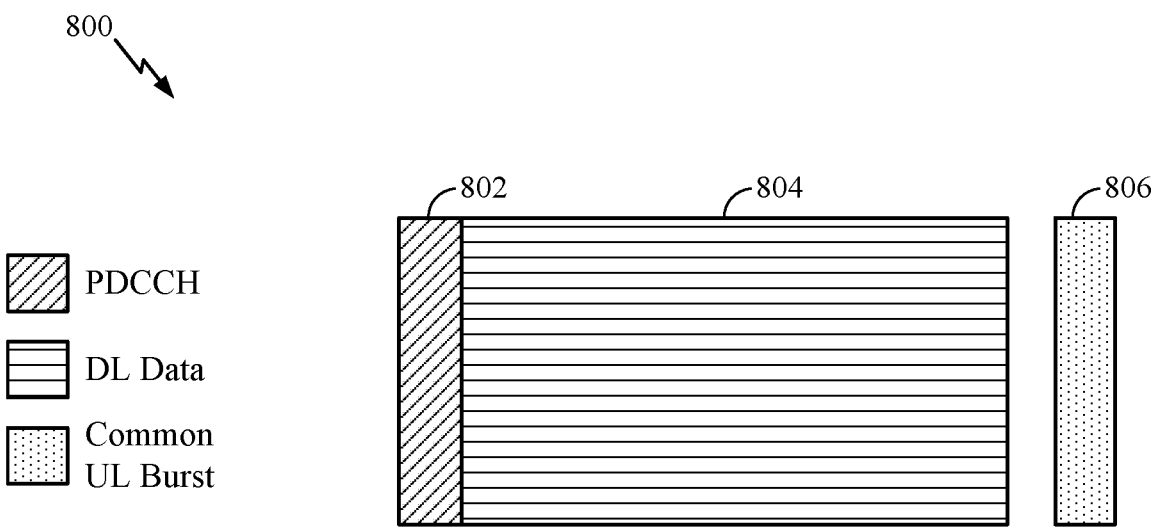
FIG. 8 is a diagram illustrating an example of a downlink (DL)-centric subframe, in accordance with certain aspects of the present disclosure.

FIG. 8 is a diagram showing an example of a DL-centric subframe 800. The DL-centric subframe 800 may include a control portion 802. The control portion 802 may exist in the initial or beginning portion of the DL-centric subframe 800. The control portion 802 may include various scheduling information and/or control information corresponding to various portions of the DL-centric subframe 800. The control portion 802 may be a physical DL control channel (PDCCH), as shown in FIG. 8. The DL-centric subframe 800 may also include a DL data portion 804. The DL data portion 804 may be referred to as the payload of the DL-centric subframe 800. The DL data portion 804 may include the communication resources utilized to communicate DL data from the scheduling entity (e.g., UE or BS) to the subordinate entity (e.g., UE). The DL data portion 804 may be a physical DL shared channel (PDSCH).

The DL-centric subframe 800 may also include a common UL portion 806. The common UL portion 806 may be referred to as an UL burst, a common UL burst, and/or various other suitable terms. The common UL portion 806 may include feedback information corresponding to various other portions of the DL-centric subframe 800. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to RACH procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe 800 and alternative structures having similar features may exist without necessarily deviating from the aspects described herein.

Figure 9:
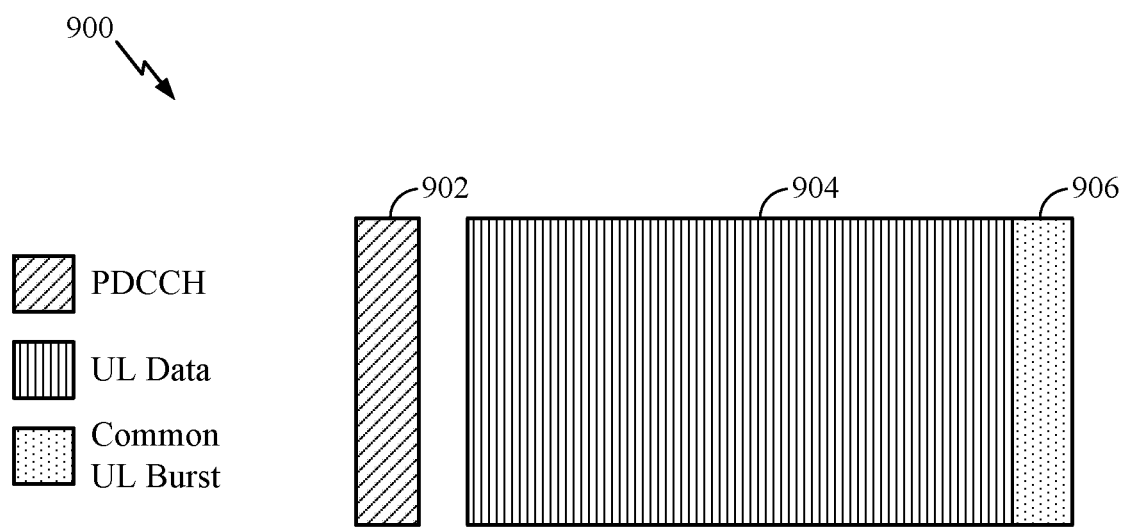
FIG. 9 is a diagram illustrating an example of an uplink (UL)-centric subframe, in accordance with certain aspects of the present disclosure.

FIG. 9 is a diagram showing an example of an UL-centric subframe 900. The UL-centric subframe 900 may include a control portion 902. The control portion 902 may exist in the initial or beginning portion of the UL-centric subframe 900. The control portion 902 in FIG. 9 may be similar to the control portion 802 described above with reference to FIG. 8. The UL-centric subframe 900 may also include an UL data portion 904. The UL data portion 904 may be referred to as the payload of the UL-centric subframe 900. The UL portion may refer to the communication resources utilized to communicate UL data from the subordinate entity (e.g., UE) to the scheduling entity (e.g., UE or BS). The control portion 902 may be a physical downlink control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 900 may also include a common UL portion 906. The common UL portion 906 in FIG. 9 may be similar to the common UL portion 806 described above with reference to FIG. 8. The common UL portion 906 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum)

Example Independent Wakeups from Deep Sleep for Broadcast and Unicast Service

In the context of machine type communications (MTC) and Internet of Things (IoT) communications, user equipments (UEs) (e.g., such as a UE 120) may use power saving functions in which the UEs go to deep sleep (e.g., not follow any access stratum procedure). As a result, these UEs may become unreachable to the network, for very long times (e.g., tens of minutes, hours, or even days). Examples of these power savings functions include extended idle mode discontinuous reception (eDRX) and power saving mode (PSM).

These functions have the following common characteristics: both are designed for UEs to have wakeup time windows (e.g., the paging time window (PTW) for eDRX, or the pTAU connected+active time) in a statistically distributed manner. Both of these solutions were designed for unicast service, where it is better in terms of resource utilization distribution that devices wake up at different times. However, in the case of Multimedia Broadcast Multicast Services (MBMS), it is better for all UEs to be awake at roughly the same time for broadcast delivery. MBMS is not effective if all UEs wake up at different times. In NB-IoT and/or MTC, many devices in these modes may be highly unreachable for a long time. For example, in eDRX a UE may be unreachable for up to a few hours. Even worse, for PSM, maximum unreachability may be up to ~10 days, for example. This means potentially large delays for reconfiguration/service announcement. In particular broadcast service announcement may need to be repeated for a very long duration of time.

Aspects of the present disclosure, however, provide techniques for UEs receiving a same broadcast user service to be awake at relatively the same time (or times) to receive, or discover, the broadcast data. For example, the UE can determine times to be awake even when the power savings configuration indicates for the UE to be in a sleep mode. The time intervals the UE stays awake to receive MBMS service or to discover if there is any MBMS service requested to be received by an application scheduled for delivery, to be different from the wakeup intervals negotiated for eDRX or PSM.

Aspects of the present disclosure may allow reuse of existing multicast/broadcast architecture in networks that allow devices to enter deep sleep modes. The techniques may allow such devices to receive traffic on multicast/broadcast. The traffic may include a message for the group of UEs (e.g. device triggering to report) and/or a software update for the group of UEs, for example. Aspects of the present disclosure may help promote successful delivery of downlink data via MBMS bearer(s) by helping ensure a group of UEs in the group are awake and ready to receive MBMS traffic at that time. As will be described below, aspects of the present disclosure allow UEs to know when they should not be in a deep sleep (e.g., when they should wake from a deep sleep or stay awake rather than enter a deep sleep) in order receive or discover the broadcast data/traffic.

FIG. 10 illustrates example operations 1000 that may be performed by a UE, such as a UE 120, in accordance with aspects of the present disclosure. At 1002, the UE (e.g., a receiver at the UE, which may include the antennas 252, demodulators 254, MIMO detector 256, receive processor 258, controller/processor 280, and/or data sink 260 and/or the receiver 512) receives a power savings configuration indicating sleep periods during which the UE is scheduled to be unreachable (e.g., for paging and/or mobile terminal unicast service).

At 1004, the UE (e.g., at least one processor at the UE, such as the controller/processor 280 or the processor 504, that is coupled with a memory at the UE such as memory 282 or memory 506) determines at least one time, during at least a portion of one of the indicated sleep periods, when the UE is to be awake in order to at least one of receive or discover MBMS user services.

According to certain aspects, the UE (e.g., the controller/processor 280) determines at least another time for the UE to be awake in order to receive and/or discover MBMS user services and performs (e.g., the receiver and/or the processor) defined connected mode procedures to receive or discover the MBMS user services if the UE is in a connected mode when the at least another time for the UE to be awake occurs. The UE (e.g. the receiver and/or the processor) perform defined idle mode procedures to receive or discover the MBMS user services if the UE is in an idle mode and reachable when the at least one time for the UE to be awake occurs. The UE (e.g., the processor) enters a sleep mode after receiving or discovering the MBMS user services if the UE is scheduled to be unreachable when the at least one time for the UE to be awake occurs.

According to certain aspects, based on a type of the MBMS user service, the UE (e.g., the processor) refrains from updating a Mobility Management Entity (MME) to enter a connected mode and receives or discovers (e.g., via the receiver) the MBMS user services while in an idle mode or enters a connected mode to receive or discover the MBMS user services.

According to certain aspects, the UE (e.g., the processor) remains awake during the at least one time for the UE to be awake if the UE is participating in an MBMS data transfer (e.g., via the receiver) when the at least one time for the UE to be awake occurs. The UE (e.g., the processor) remains awake after an MBMS data transfer if a duration between the MBMS data transfer and the at least one time for the UE to be awake is less than a threshold value. For example, the UE (e.g., the processor) does not enter a scheduled sleep period and continues an MBMS Broadcast session after completion of the MBMS data transfer. The UE (e.g., the processor) enters sleep modes during the indicated sleep periods according to the power savings configuration if the UE is not aware of a scheduled MBMS Broadcast session or ongoing MBMS data transfer during the indicated sleep period.

According to certain aspects, the UE (e.g., the processor) wakes up at to receive (e.g., via the receiver) MBMS service announcements that advertise the MBMS user services. The UE (e.g., the processor) determines the at least one time for the UE to be awake based on the MBMS service announcements. The MBMS data may be delivered in a file comprising multiple fragments. In this case, the UE (e.g., the processor) remains awake until all fragments of the file are received (e.g., via the receiver). The UE may receive (e.g., via the receiver) a schedule of the multiple fragments and decide (e.g., by the processor) whether to remain awake or enter a sleep mode in between scheduled fragments.

Figure 11:
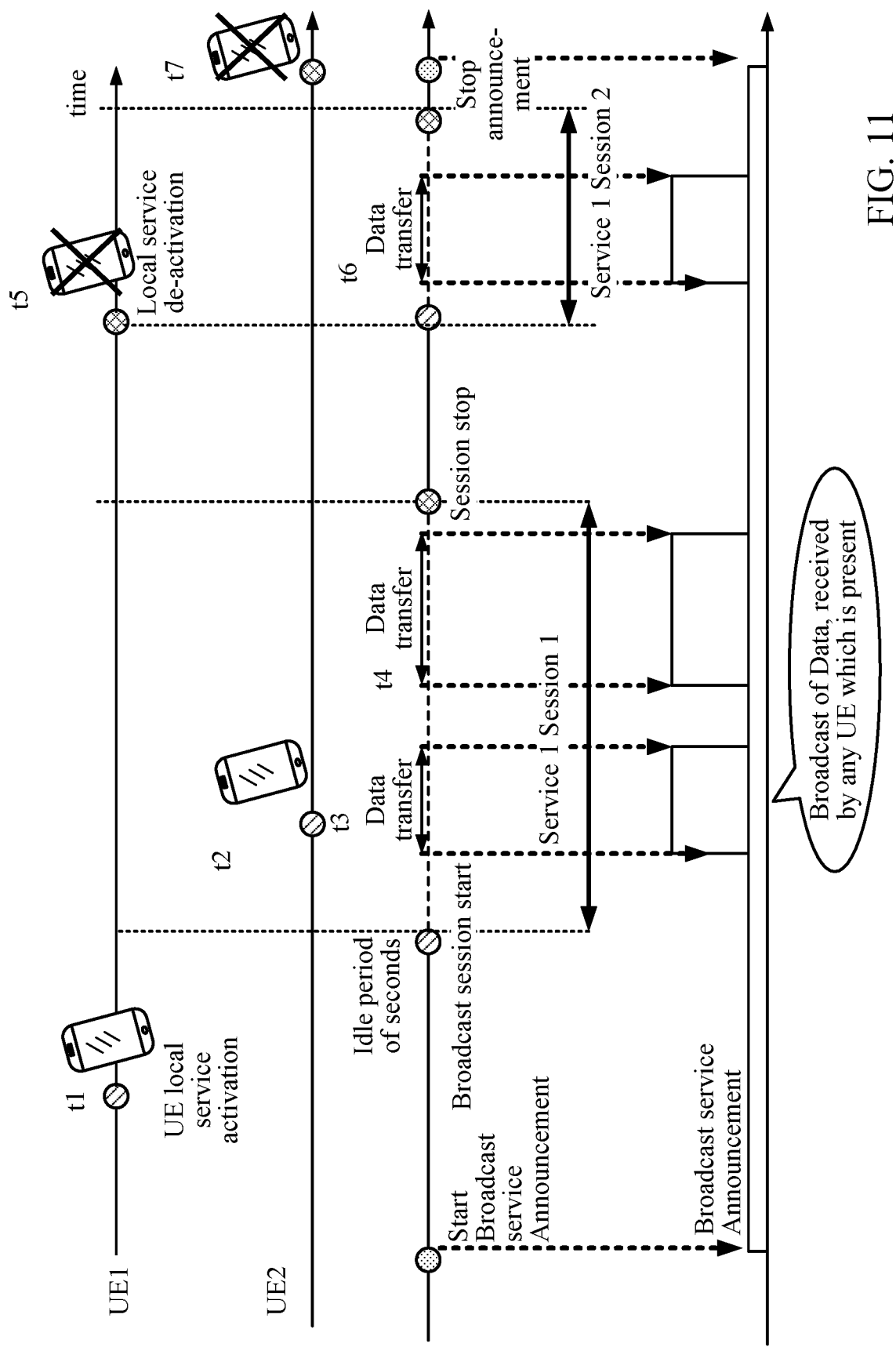
FIG. 11 illustrates an example broadcast service timeline, in accordance with certain aspects of the present disclosure.

According to certain aspects, a UE wakeup time interval (including times a UE awakens from sleep as well as times a UE stays awake when already awake) for MBMS service may not coincide with the wakeup time windows indicated by an eDRX (PTW) and/or PSM (periodic TAU+active time) configuration. FIG. 11 illustrates how configured wakeup time windows may not allow a UE to receive MBMS transmissions. For example, as shown in FIG. 11, UE1 is awake from t1 until t5. During the period between t1 and t5, UE1 receive the two MBMS data transfers starting at t3 and t4 of the MBMS service 1, session 1; however, the UE1 goes to sleep before receiving the third data transfer starting at t6 for the MBMS service 1, session 2. UE2, on the other hand, wakes up at t2 and goes to sleep at t7 and, therefore, is able to receive all three MBMS data transfers starting at t3, t4, and t6. As illustrated in FIG. 11, a broadcast service announcement announces the occurrence of broadcast services and may be designed to reach all UEs while they are awake.

Aspects of the present disclosure allow the UE "wakeups" due to MBMS user service to be relatively independent of the UE "wakeup intervals for unicast service". The "wakeup intervals for unicast service" may correspond to periods when the UE becomes reachable (e.g. due to PTW in eDRX or trigger to connect or due to periodic TAU timer expiration) plus active time once in idle mode. In other words, aspects of the present disclosure recognize that there are times for the UE to be awake for receiving or discovering MBMS user services that may not coincide with the UE already being reachable for unicast service (i.e., times when the UE is configured with a sleep period).

Aspects of the present disclosure address various cases. For example, in one case, the MBMS broadcast (e.g., time for the UE to be awake to discover MBMS service or receive an MBMS data transfer) may coincide (e.g., occur when) with the UE already being in connected mode due to other reasons. In this case, the UE may follow normal connected mode procedures to receive and/or discover the MBMS broadcast.

In another case, the MBMS broadcast may coincide with the UE already being in idle mode and reachable (e.g. in configured active time for PSM or PTW for eDRX). In this case, the UE may follow normal idle mode procedure.

Figure 12:
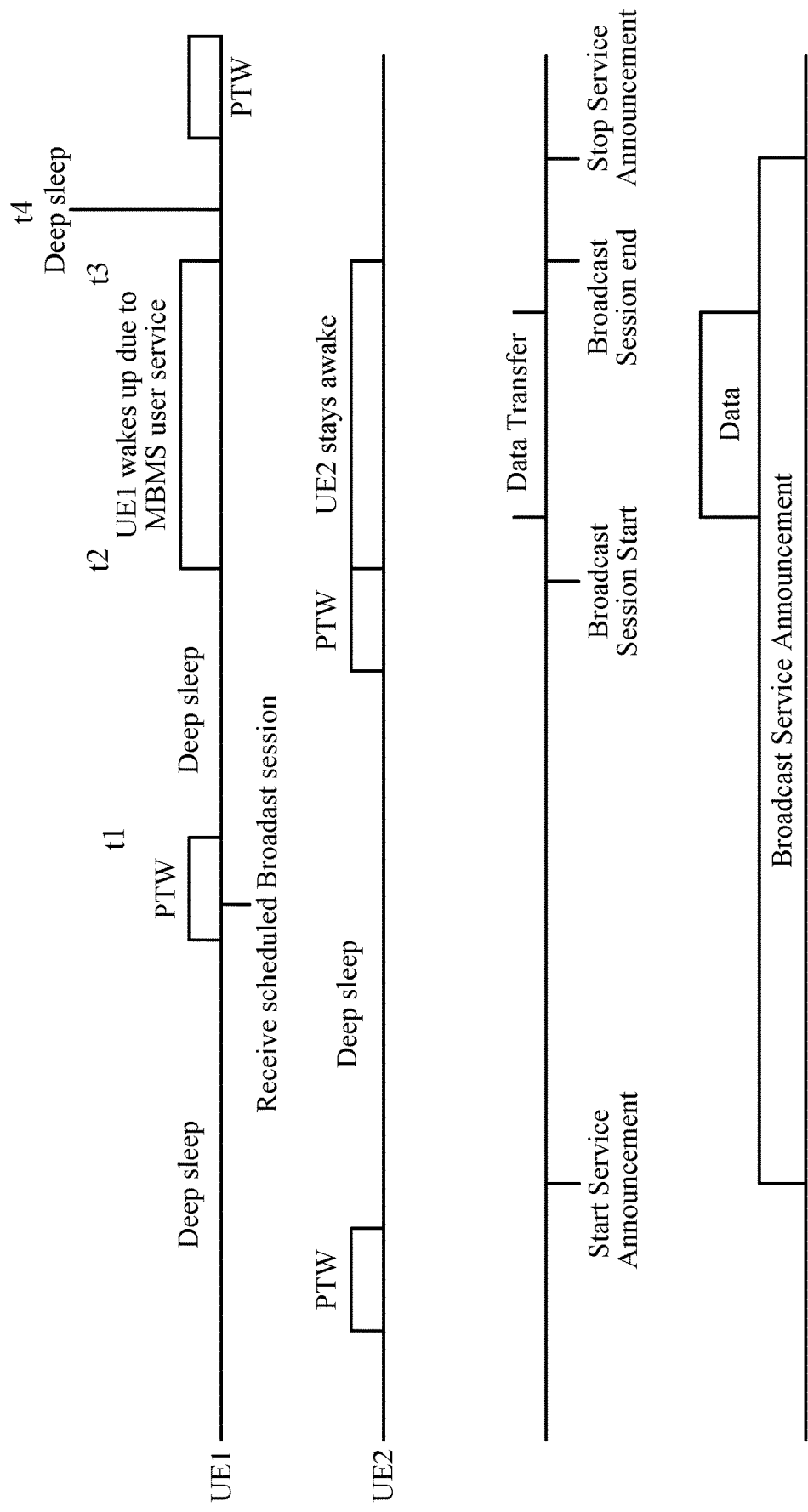
FIG. 12 illustrates an example user service broadcast timeline for event-based wakeup, in accordance with certain aspects of the present disclosure.

In another case, the MBMS broadcast may coincide with the UE being in idle mode and in deep sleep, and therefore, unreachable for paging to the network. In this case, the UE may leave the deep sleep (e.g., wake up) to discover and/or receive MBMS user service. As shown in FIG. 12, the UE1 goes to deep sleep at t1 after the PTW. Although the deep sleep, in the example shown in FIG. 12, is configured to end at t4, the UE 1 wakes up from t2 to t3 for MBMS session to receive the data transfer.

Some MBMS user services can be received in the idle mode. For these services, the idle mode UE may not transition to the connected mode to receive the MBMS user service. In that case, the UE may not update the mobile management entity (MME) to enter the connect mode to become reachable for paging. In other words, the UE is still considered unreachable for paging in the MME. This approach may help minimize the signaling between the UE and the network.

On the other hand, some MBMS user services (e.g. for HTTP reception reporting, file repair, etc.) are received in the connected mode. Thus, the idle mode UE transitions to the connected mode and then the UE may perform regular procedures to be in EPS connection management (ECM) connected mode and become reachable.

In another case, if the UE is participating in an ongoing MBMS data transfer and the UE is scheduled (e.g., by the power save configuration) to move to a deep sleep mode/state due to power saving (e.g., end of PTW for eDRX or expiration of active time for PSM), then the UE does not go to deep sleep during the remainder of the MBMS data transfer, even during scheduled sleep period. As shown in FIG. 12, the UE 2 PTW coincides with the MBMS broadcast session at t2 and, thus, the UE 2 remains awake until the end of the MBMS broadcast session at t3. If at the end of MBMS data transfer, the UE knows if there is another MBMS data transfer scheduled soon, in that case depending of the time between MBMS data transfers, the UE may not go to sleep between MBMS data transfers. Thus, the UE may in fact not go to deep sleep while in an MBMS Broadcast session. For example, if the time between the data transfers is short, the UE remains awake. If the time between data transfers is longer (e.g., greater than a threshold duration), then the UE may return to a sleep mode between the data transfers.

There are various aspects for determining the UE wakeup time intervals for MBMS service. For event-based wakeup for MBMS user service, each UE follows regular wakeups (e.g., according to the eDRX or PSM configuration) except when the UE is aware of a scheduled MBMS Broadcast session. For example, the UE may discover a scheduled or ongoing MBMS Broadcast session for which an application has requested reception while in one of the regular wakeups for eDRX/PSM. Since the service delay may be dictated by the eDRX or PSM parameters, a UE receiving this type of broadcast service may be configured by the application server delivering the MBMS broadcast content with a maximum sleep cycle time. The UE adjusts either the requested eDRX cycle length or requested pTAU timer in the NAS attach/TAU request accordingly.

For event-based wakeup with service announcement reception, before start of MBMS Broadcast may be provided to UEs either via MBMS broadcast mode or unicast. The service announcement may be provided by MBMS Broadcast mode to advertise MBMS Broadcast user Services. For very long sleep cycles, the network broadcasts the service announcement for a very long period of time (e.g., hours for PSM), making it inefficient in terms of overhead. Other potential service announcement delivery mechanisms include, for example, a PUSH mechanism (WAP, SMS-PP, MMS) or URL (HTTP, FTP). In the URL approach, the UE may connect and fetch the configuration from the URL at a certain periodicity. File downloads may only occur every once in a while. SMS triggering may be used to notify the UEs to perform URL retrieving. A similar timeline applies to unicast service announcement.

The application server may be aware of the maximum deep sleep cycle targeted UEs have. This can be done over the top, by configuration, or received via service capability exposure function (SCEF) exposure. The time between service announcement start and the start of broadcast session should be larger than the maximum deep sleep cycle of the targeted devices.

For repeated content broadcast transmission, specific temporary mobile group identities (TMGIs) may be reserved and transmit the same content (as fragments) until all the UEs receive the full content or for a certain period of time larger than the deep sleep cycle (e.g. eDRX cycle or periodic TAU for PSM). In this case, the UE may follow the normal power cycle for unicast (eDRX and/or PSM). Once the UE wakes up, if it discovers an MBMS user service broadcast transmission that it is configured to receive, the UE may stay awake until the file is completely received.

Figure 13:
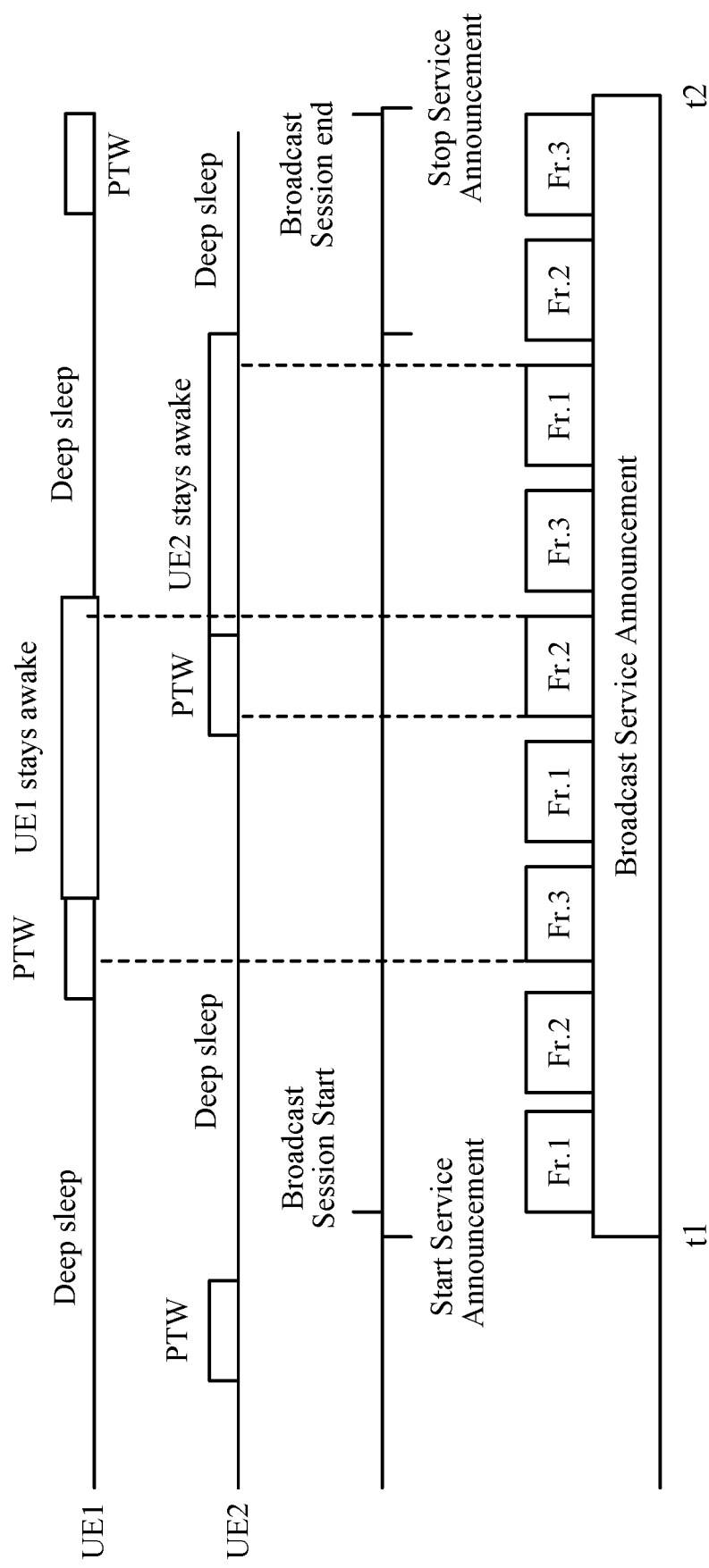
FIG. 13 illustrates an example repeated content broadcast timeline, in accordance with certain aspects of the present disclosure.

As illustrated in FIG. 13, the UE1 and UE2 receives the MBMS broadcast data files in fragments. The UEs can decide whether to stay awake or go to sleep in between scheduled file fragments. In the example shown in FIG. 13, Fr. "X" refers to the fragment number of the file being announced and broadcast. For example, in FIG. 13, the fragments 1, 2, and 3 corresponds to a data file. When the UE wakes up (e.g., due to PTW start for eDRX), the UE discovers the ongoing MBMS session, and starts receiving the fragments as soon as they are being broadcasted (in any order). Once all fragments are received (in the example, Frs. 1 2 and 3), the UE may go back to deep sleep if the eDRX configurations indicates a sleep period for that time. This approach may have a benefit that the UE only stays awake for MBMS service during broadcast session.

Figure 14:
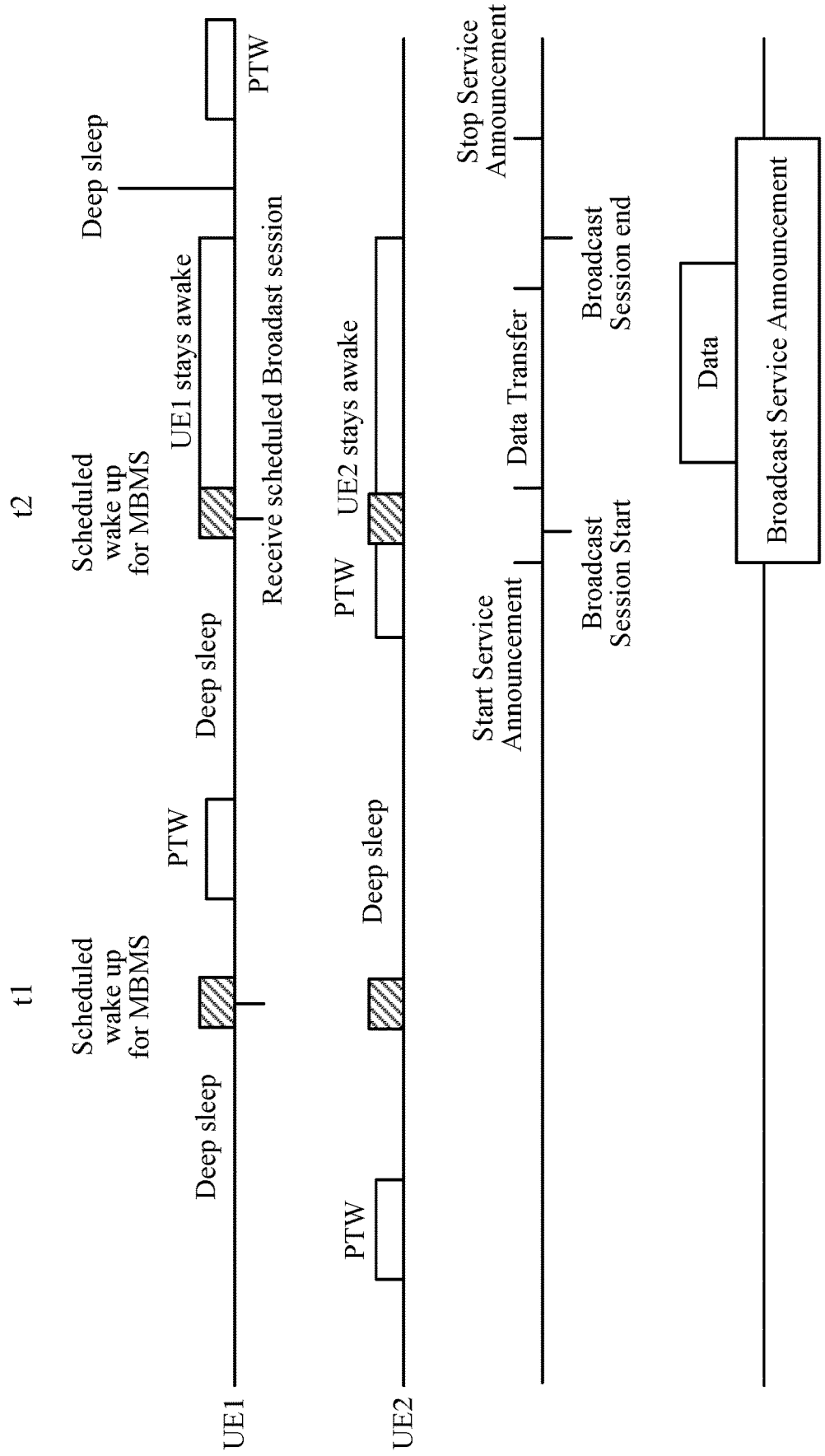
FIG. 14 illustrates an example timeline for wakeups, in accordance with certain aspects of the present disclosure.

For periodic wakeups, the UE wakes up periodically for potential discovery of service announcements and/or for data reception of MBMS user service. As illustrated in FIG. 14, a UE belonging to a group or wanting to receive a specific MBMS user service (e.g., UE 1 and UE 2) may be configured to wake up at periodic time intervals (e.g., every day at midnight) to receive service announcements and potentially receive data. As shown in FIG. 14, the UE 1 and UE 2 are scheduled to wake up at periodic intervals starting at t1 and t2. The time interval may contain time of wakeup and time window interval. The UE may extend its wakeup time if it is receiving MBMS (e.g. still receiving a file) at the end of the time window interval, as shown in FIG. 14 after the wakeup interval starting at t2. The application server may schedule file/message delivery at those wakeup time intervals.

Periodic wakeup may have the benefit that it can be supported without further changes in the network. Further, delay for broadcast reception may be independent of unicast service delay tolerance. This may also be a relatively simple approach for application developers (to deal with one interface)

The application server or the broadcast multicast service center (BM-SC) may configure the UE to wake up for potential MBMS service at specific times (e.g., every day at a specific time, every X hours, every Monday at specific time(s), specific dates in specific month(s) at a specific time(s), etc.). The UE may also receive a specific TMGI for the MBMS user service. This TMGI is statically allocated for the particular service. The UE may follow regular wakeups indicated by eDRX or PSM configuration, with exceptions for the independent wakeups to discover or receive MBMS user services. The UE wakes up and checks MBMS control channel (MCCH). The UE may receive a service announcement. If the UE recognizes a TMGI allocated to the particular service the UE is seeking, the UE may perform MBMS reception at the scheduled MBMS Broadcast session time interval. The UE may provide an application programming interface (API) for applications to configure these wakeups. This configuration may be transparent to the core network.

As described by the various options herein, eDRX/PSM configuration and configuration of wakeups for MBMS may be independent. Aspects may improve broadcast services for UEs, such as MTC and IoT UEs configured for power savings.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
receiving a power savings configuration for a unicast service indicating one or more sleep periods, during which the UE is scheduled to be unreachable for unicast service paging and mobile terminated unicast service, and one or more awake periods, during which the UE is scheduled to be reachable for unicast service paging and mobile terminated unicast service;
before entering at least one of the indicated sleep periods for the unicast service, determining at least one time during at least a portion of the at least one of the indicated sleep periods for the UE to be awake in order to at least one of: receive or discover one or more Multimedia Broadcast Multicast Services (MBMS) user services; and
receiving or discovering the one or more MBMS user services during the determined portion of the at least one of the indicated sleep periods for the unicast service.

2. The method of claim 1, further comprising:
determining at least another time for the UE to be awake in order to at least one of: receive or discover one or more MBMS user services; and
performing defined connected mode procedures to receive or discover the one or more MBMS user services if the UE is in a connected mode when the at least another time for the UE to be awake occurs.

3. The method of claim 1, further comprising performing defined idle mode procedures to receive or discover the MBMS user services if the UE is in an idle mode and reachable when the at least one time for the UE to be awake occurs.

4. The method of claim 1, further comprising entering a sleep mode after receiving or discovering the one or more MBMS user services.

5. The method of claim 1, further comprising, based on a type of the one or more MBMS user services:
refraining from updating a Mobility Management Entity (MME) to enter a connected mode, and
receiving or discovering the one or more MBMS user services while in an idle mode.

6. The method of claim 1, further comprising, based on a type of the one or more MBMS user services, entering a connected mode to receive or discover the MBMS user services.

7. The method of claim 1, wherein receiving or discovering the one or more MBMS user services during the determined portion of the at least one sleep period comprises remaining awake after one of the one or more awake periods when the UE is participating in an MBMS data transfer when the determined at least one time during the portion of the at least one sleep period for the UE to be awake occurs.

8. The method of claim 1, wherein receiving or discovering the one or more MBMS user services during the determined portion of the at least one sleep period comprises remaining awake after an MBMS data transfer when a duration between the MBMS data transfer and the determined at least one time during the portion of the at least one sleep period for the UE to be awake is less than a threshold value.

9. The method of claim 8, wherein remaining awake after the MBMS data transfer comprises not entering a scheduled sleep period and continuing an MBMS Broadcast session after completion of the MBMS data transfer.

10. The method of claim 1, further comprising entering a sleep mode during at least one of the indicated sleep periods according to the power savings configuration if the UE is not aware of a scheduled MBMS Broadcast session or ongoing MBMS data transfer during at least one of the indicated sleep periods.

11. The method of claim 1, further comprising:
waking up to receive MBMS service announcements that advertise the MBMS user services, wherein
the determination of the at least one time for the UE to be awake is based on the MBMS service announcements.

12. The method of claim 1, wherein:
MBMS data is delivered in a file comprising multiple fragments; and
the UE is configured to remain awake until all fragments of the file are received.

13. The method of claim 1, wherein:
MBMS data is delivered in a file comprising multiple fragments; and
the method further comprises:
receiving a schedule of the multiple fragments; and
deciding whether to remain awake or enter a sleep mode in between scheduled fragments.

14. The method of claim 1, wherein:
the one or more awake periods indicated by the power savings configuration correspond to at least one of a paging time window (PTW) or an active time; or
the one or more sleep periods indicated by the power savings configuration correspond to at least one of an end of a PTW or expiration of the active time.

15. An apparatus for wireless communications, comprising:
means for receiving a power savings configuration for a unicast service indicating one or more sleep periods, during which the UE is scheduled to be unreachable for unicast service paging and mobile terminated unicast service, and one or more awake periods, during which the UE is scheduled to be reachable for unicast service paging and mobile terminated unicast service;
means for determining, before entering at least one of the indicated sleep periods for the unicast service, at least one time during at least a portion of the at least one of the indicated one or more sleep periods for the apparatus to be awake in order to at least one of: receive or discover one or more Multimedia Broadcast Multicast Services (MBMS) user services; and
means for receiving or discovering the one or more MBMS user services during the determined portion of the at least one of the indicated sleep periods for the unicast service.

16. The apparatus of claim 15, further comprising:
means for determining at least another time for the apparatus to be awake in order to at least one of: receive or discover one or more MBMS user services;
means for performing defined connected mode procedures to receive or discover the one or more MBMS user services if the apparatus is in a connected mode when the at least another time for the apparatus to be awake occurs; and
code for receiving or discovering the one or more MBMS user services during the determined portion of the at least one of the indicated sleep periods.

17. The apparatus of claim 15, further comprising means for performing defined idle mode procedures to receive or discover the MBMS user services if the apparatus is in an idle mode and reachable when the at least one time for the apparatus to be awake occurs.

18. The apparatus of claim 15, further comprising means for entering the sleep mode after receiving or discovering the one or more MBMS user services.

19. The apparatus of claim 15, further comprising, based on a type of the one or more MBMS user service:
means for refraining from updating a Mobility Management Entity (MME) to enter a connected mode, and
means for receiving or discovering the one or more MBMS user services while in an idle mode.

20. The apparatus of claim 15, further comprising means for entering a connected mode to receive or discover the MBMS user services based on a type of the one or more MBMS user services.

21. The apparatus of claim 15, wherein receiving or discovering the one or more MBMS user services during the determined portion of the at least one sleep period comprises remaining awake after one of the one or more awake periods when the apparatus is participating in an MBMS data transfer when the determined at least one time during the portion of the at least one sleep period for the apparatus to be awake occurs.

22. The apparatus of claim 15, wherein receiving or discovering the one or more MBMS user services during the determined portion of the at least one sleep period comprises means for remaining awake after an MBMS data transfer when a duration between the MBMS data transfer and the determined at least one time during the portion of the at least one sleep period for the apparatus to be awake is less than a threshold value.

23. The apparatus of claim 22, wherein means for remaining awake after the MBMS data transfer comprises means for not entering a scheduled sleep period and continuing an MBMS Broadcast session after completion of the MBMS data transfer.

24. The apparatus of claim 15, further comprising means for entering a sleep mode during at least one of the indicated sleep periods according to the power savings configuration if the apparatus is not aware of a scheduled MBMS Broadcast session or ongoing MBMS data transfer during at least one of the indicated sleep periods.

25. The apparatus of claim 15, further comprising:
means for waking up to receive MBMS service announcements that advertise the MBMS user services, wherein
the determination of the at least one time for the apparatus to be awake is based on the MBMS service announcements.

26. The apparatus of claim 15, wherein:
MBMS data is delivered in a file comprising multiple fragments; and
the apparatus is configured to remain awake until all fragments of the file are received.

27. The apparatus of claim 15, wherein:
MBMS data is delivered in a file comprising multiple fragments; and
the apparatus further comprises:
means for receiving a schedule of the multiple fragments; and
means for deciding whether to remain awake or enter a sleep mode in between scheduled fragments.

28. An apparatus for wireless communications, comprising:
at least one processor coupled with a memory and configured to:
receive a power savings configuration for a unicast service indicating one or more sleep periods, during which the UE is scheduled to be unreachable for unicast service paging and mobile terminated unicast service, and one or more awake periods, during which the UE is scheduled to be reachable for unicast service paging and mobile terminated unicast service;

determine, before entering at least one of the indicated sleep periods for the unicast service, at least one time during at least a portion of the at least one of the indicated sleep periods for the apparatus to be awake in order to at least one of: receive or discover one or more Multimedia Broadcast Multicast Services (MBMS) user services; and receive or discover the one or more MBMS user services during the determined portion of the at least one of the indicated sleep periods for the unicast service.

29. A method for wireless communication performed by a user equipment (UE) comprising:

operating in a discontinuous reception (DRX) mode for a unicast service associated with periodic awake periods separated by respective periodic sleep periods, the UE being configured to be in an awake state during the awake periods to transmit or receive unicast communications associated with the unicast service, and configured to be in a sleep state during the sleep periods based on operating in the DRX mode;

receiving scheduling indicating one or more broadcast or multicast communications associated with a Multimedia Broadcast Multicast Services (MBMS) user service;

determining, during an awake period for the unicast service, that a broadcast or multicast communication of the one or more broadcast or multicast communications associated with the MBMS user service is scheduled to occur during a portion of an upcoming sleep period of the periodic sleep periods for the unicast service;

operating in an awake state during the portion of the sleep period to receive the broadcast or multicast communication.

30. The method of claim 29, wherein the received scheduling indicates periodic broadcast or multicast communications associated with the MBMS user service including the broadcast or multicast communication determined to occur during the portion of the upcoming sleep period of the periodic sleep periods, an interval between the periodic awake periods being different than an interval between the periodic broadcast or multicast communications.

31. The method of claim 29, wherein the awake state is a connected mode state or an idle mode state.

32. The method of claim 29, further comprising:

transitioning to the sleep state for a first portion of the sleep period prior to the portion of the sleep period during which the broadcast or multicast communication is to occur; and transitioning to the awake state, after transitioning to the sleep state, prior to the portion of the sleep period during which the broadcast or multicast communication is to occur; and transitioning to the sleep state during a second portion of the sleep period after the portion of the sleep period during which the broadcast or multicast communication is to occur.

33. The method of claim 29, further comprising:

refraining from transitioning to the sleep state for the sleep period before the portion of the sleep period during which the broadcast or multicast communication is to occur;

remaining in the awake state during the portion of the sleep period during which the broadcast or multicast communication is to occur; and transitioning to the sleep state during a second portion of the sleep period after the portion of the sleep period during which the broadcast or multicast communication is to occur.

* * * * *